United States Patent [19]

Hagiwara et al.

[11] Patent Number: 4,525,791

[45] Date of Patent: Jun. 25, 1985

[54] METHOD AND APPARATUS FOR REDUCING VIBRATIONS OF STATIONARY INDUCTION APPARATUS

[75] Inventors: Syuya Hagiwara, Mito; Yasuro Hori, Katsuta, both of Japan

[73] Assignee: Hitachi, Ltd., Tokyo, Japan

[21] Appl. No.: 406,564.

[22] Filed: Aug. 9, 1982

[30] Foreign Application Priority Data

Aug. 11, 1981 [JP] Japan ................................ 56-124673

[51] Int. Cl.$^3$ ............................................ G06F 15/31

[52] U.S. Cl. ...................................... 364/508; 73/579; 364/570

[58] Field of Search ............... 364/508, 574, 576, 570, 364/575; 73/570, 576, 579, 602, 618, 657; 336/100

[56] References Cited

U.S. PATENT DOCUMENTS

| | | | |
|---|---|---|---|
| 3,710,082 | 1/1973 | Sloane et al. | 364/576 X |
| 3,731,526 | 5/1973 | Games | 364/508 X |
| 3,848,115 | 11/1974 | Sloane et al. | 364/508 |
| 4,025,724 | 5/1977 | Davidson, Jr. et al. | 364/574 X |
| 4,181,029 | 1/1980 | Talbott, Jr. | 364/508 X |
| 4,310,892 | 1/1982 | Himmler | 364/508 |
| 4,372,164 | 2/1983 | Brown et al. | 364/508 X |
| 4,408,285 | 10/1983 | Sisson et al. | 364/508 |
| 4,435,751 | 3/1984 | Hori et al. | 364/574 |

FOREIGN PATENT DOCUMENTS 123782 10/1978 Japan ..................................... 73/570

*Primary Examiner*—Edward J. Wise
*Attorney, Agent, or Firm*—Antonelli, Terry & Wands

[57] ABSTRACT

Disclosed are a method and an apparatus for reducing vibrations generated in a stationary induction apparatus by detecting the vibration and by applying a vibration applying force capable of suppressing the detected vibrations to the stationary induction apparatus by at least one vibration applying device, in which the phase and amplitude of the vibration applying force of the vibration applying device are successively and repeatedly adjusted so as to decrease the sum of squares of the respective amplitudes of vibration detected by the vibration sensors. A calculation for obtaining the sum of squares of the detected amplitudes of vibration and the control of the phase and amplitude of the vibration applying force based upon the calculated sum of squares may be carried out in accordance with a program stored in a microcomputer.

11 Claims, 11 Drawing Figures

METHOD AND APPARATUS FOR REDUCING VIBRATIONS OF STATIONARY INDUCTION APPARATUS

The present invention relates to a method and an apparatus for reducing vibrations of a stationary induction apparatus, such as a transformer or a reactor, or reducing noises caused by the vibrations.

In general, a stationary induction apparatus produces vibrations due to magnetostriction generated in the structure constituting a magnetic circuit or due to electromagnetic attractive force resulting from leakage flux. The vibrations thus produced are conducted to a structure confronting the outside, such as a vessel, to cause noises. Conventionally, in order to reduce the noises, there have been employed various methods in which magnetic flux density is made small, a special circuit for cancelling, the leakage flux is provided, or the whole of the stationary induction apparatus is surrounded by a sound-proof wall. However, these methods have such drawbacks that the stationary induction apparatus becomes large in size and in weight, and becomes complicated in structure, and that the noise reducing effect can not be provided in proportion to the increase in the floor space occupied by the stationary induction apparatus.

Further, it has been recently comfirmed that, in a noise reducing system in which a mass is added to a sound-proof plate to reduce vibrations of the plate, an excellent noise reducing effect can be obtained by employing, as the sound-proof plate, a steel plate which is superior in vibration attenuating ability to an ordinary steel plate. However, this system is unsuitable for a stationary induction apparatus which has been already installed, and moreover has a limit in noise reducing effect.

In view of the above-mentioned problems, there has been proposed, for example in U.S. Pat. No. 4,435,751 to Hori et al, a method in which vibrations generated in a stationary induction apparatus are detected by vibration sensors, and a vibration applying force which is substantially opposite in phase to the detected vibrations, is applied to the apparatus by means of a vibration applying device to reduce the vibrations of the stationary induction apparatus. However, in the case where vibrations are reduced by the above method, if a method of applying the vibration applying force to the stationary induction apparatus is inappropriate, vibrations at a portion of the apparatus become weak, while vibrations at another portion may become strong. That is, a desired vibration reducing effect cannot be obtained, or it takes a lot of time to put the stationary induction apparatus in an optimum weak-vibration state. Further, in the case where a plurality of vibration applying devices are provided at various positions of the stationary induction apparatus, if a method of applying vibration applying forces to the apparatus is not appropriate, only part of the vibration applying devices are required to have an excessive vibration applying force and the remaining vibration applying devices don't perform a sufficient operation.

To solve the technical problems in the method employing vibration applying devices as mentioned above, it is an object of the present invention to provide a method and apparatus for efficiently reducing vibrations of a stationary induction apparatus or noises caused by the vibrations.

In order to attain the above object, according to an aspect of the present invention, there is provided a method for reducing vibrations of a stationary induction apparatus in such a manner that vibrations generated in the stationary induction apparatus are detected by vibration sensing means and a vibration applying force capable of suppressing the detected vibrations is applied to the stationary induction apparatus by vibration applying means, which method further includes the steps of: energizing the vibration applying means; receiving phase and amplitude values of the detected vibrations from a plurality of vibration sensors making up the vibration sensing means; calculating the sum of squares of the received amplitude values; and varying the phase and amplitude of the vibration applying force outputted from the vibration applying means, in the direction of decreasing the calculated sum of the squares of the amplitude values.

Further, in order to attain the above-mentioned object, according to another aspect of the present invention, there is provided an apparatus including a plurality of vibration sensors for detecting vibrations generated in a stationary induction apparatus, at least one vibration applying device for applying a vibration applying force capable of suppressing the detected vibrations to the stationary induction apparatus, and control means for controlling the vibration applying force on the basis of the outputs of the vibration sensors, to reduce vibrations of the stationary induction apparatus, wherein the control means adjusts the phase and amplitude of the vibration applying force on the basis of the sum of the squares of amplitude values of vibration outputted from the vibration sensors.

The above-mentioned control means may include a microcomputer. In this case, the microcomputer has a program for taking in the outputs of a plurality of vibration sensors, for calculating the sum of the squares of amplitude values of vibrations, and for adjusting the phase and amplitude of the above-mentioned vibration applying force on the basis of the calculated sum of the squares.

According to the present invention, a plurality of vibration, sensors are provided at various positions, the sum of the squares of amplitudes of vibrations detected by the sensors is calculated, and the phase and amplitude of the vibration applying force are adjusted on the basis of the above sum of the squares. This is because a noise caused by a vibration is felt in human ears in proportion to the square of the amplitude of the vibration, because a significant term to noise is made more significant by the squaring operation and thereby an increase or decrease in noise is readily detected, and because, when a sampling operation is performed for the amplitude of a vibration, positive and negative sample values are obtained, but these sample values are all converted by the squaring operation into positive values, the simple sum of which can be employed to detect an increase or decrease in noise. (In the case where the positive and negative sample values are added up as they are, the positive and negative values may cancel each other, so that it might be considered that there is a weak noise or no noise, notwithstanding the fact that a loud noise is actually generated.

Other objects than stated above and features of the present invention will become apparent from the following description taken in conjunction with the accompanying drawings, in which.

Figure 1:
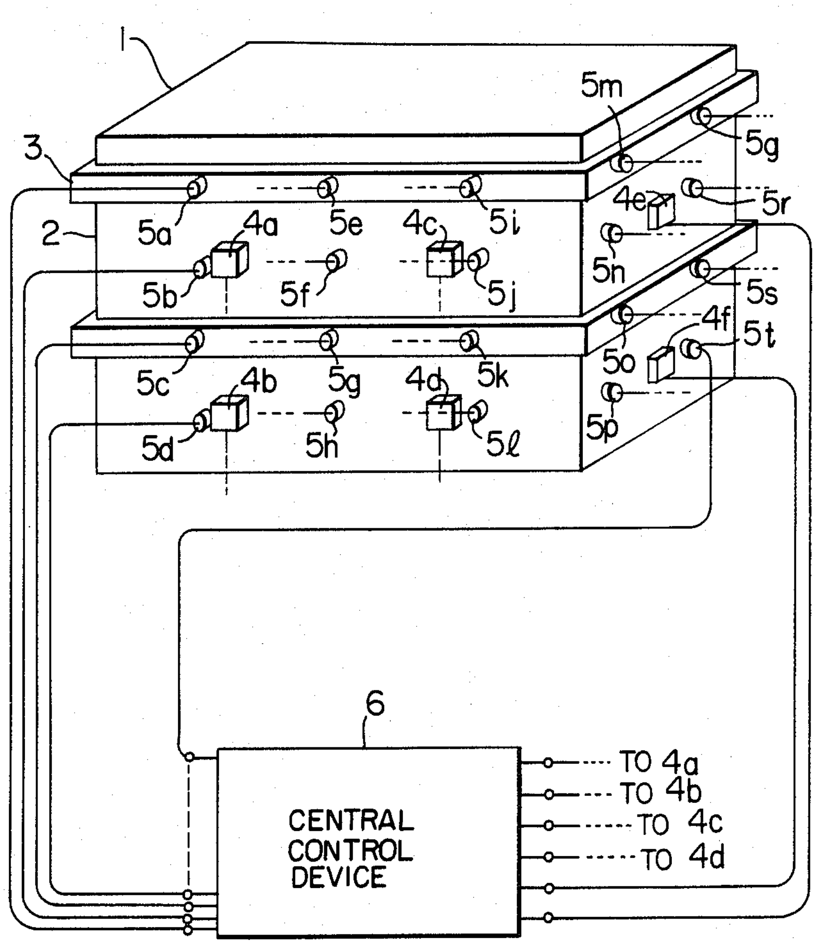
FIG. 1 is a schematic structural view showing an example of an apparatus for carrying out a vibration reducing method according to the present invention.

Now, preferred embodiments of the present invention will be described below in detail, by referring to the drawings.

FIG. 1 is a schematic view showing the structure of an apparatus for carrying out a vibration reducing method according to the present invention. Referring to FIG. 1, a plurality of vibration applying devices 4*a* to 4*f* are attached to side plates 2 of a tank 1 of a stationary induction apparatus, such as a transformer or a reactor, to reduce vibrations thereof. Further, a plurality of vibration sensors 5*a* to 5*t* are mounted on the side plates 2 and side plate reinforcing members 3. Respective outputs of the vibration sensors 5*a* to 5*t* are led to a central control device 6 which produces output signals for driving the vibration applying devices 4*a* to 4*f*.

In order to simplify the description, only two side faces of the tank 1 are considered in the embodiment shown in FIG. 1, with six vibration applying devices and twenty vibration sensors provided thereon. However, the number of vibration applying devices, the number of vibration sensors, and the positions where these devices and sensors are mounted, are not limited to those illustrated in FIG. 1. The vibration applying devices and vibration sensors may be arranged on the invisible side faces of the tank 1. Further, the number of vibration applying devices, the number of vibration sensors, and the positions thereof may be appropriately selected according to circumstances.

Figure 2:
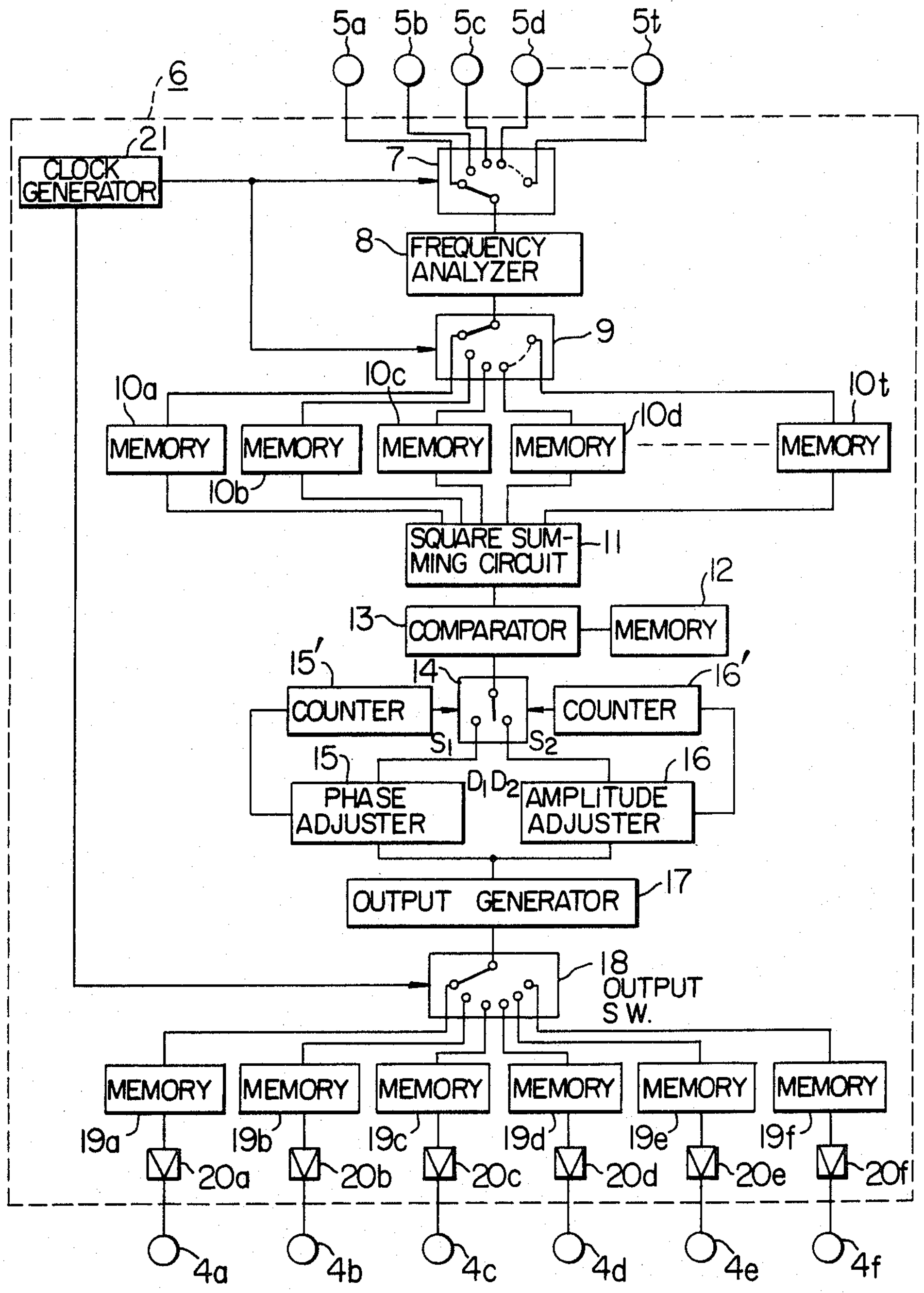
FIG. 2 is a block diagram showing a circuit configuration of the central control device shown in FIG. 1.
Figure 3:
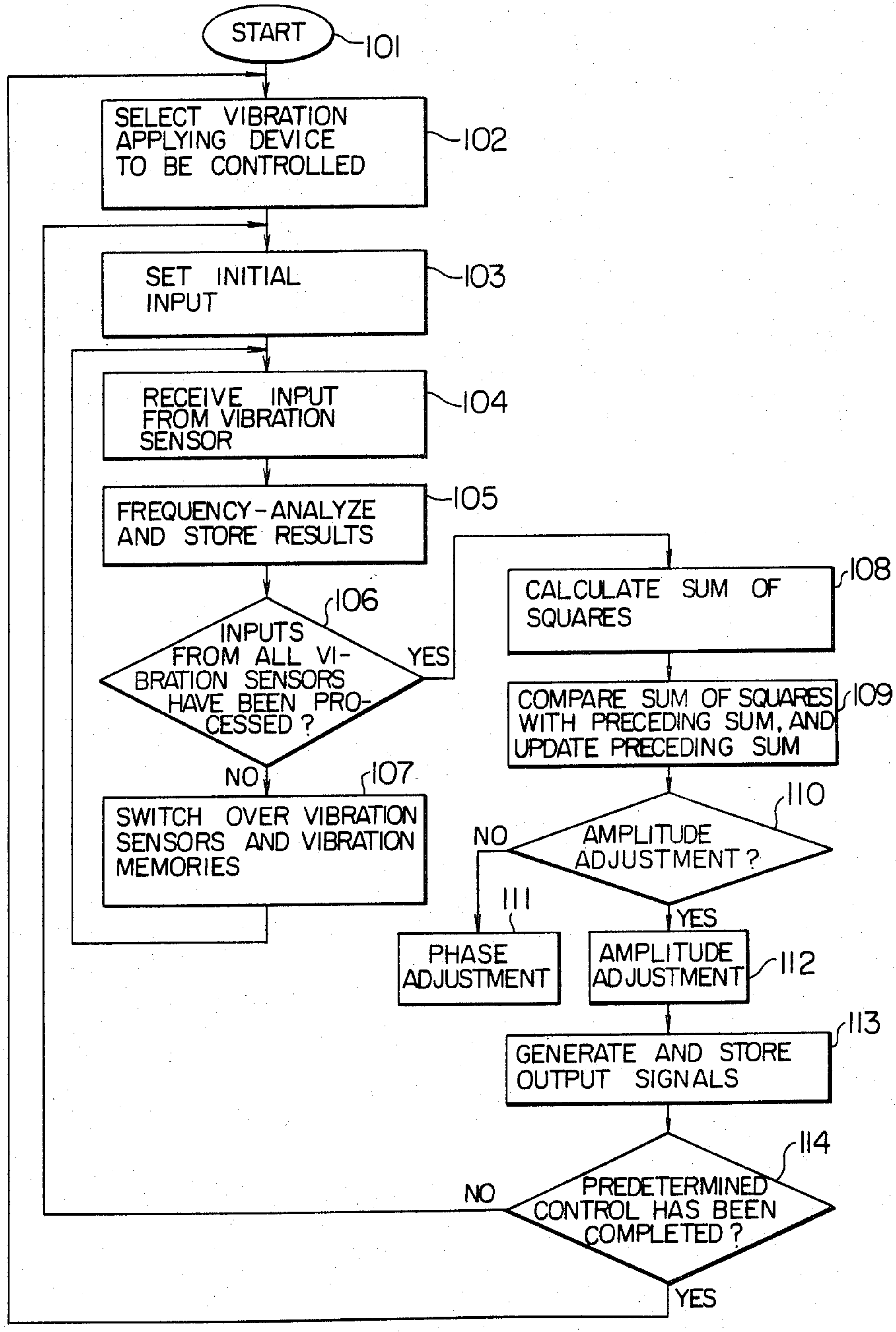
FIG. 3 is a flow chart showing an embodiment of a vibration reducing method according to the present invention, in terms of the operation of the central control device shown in FIG. 2.

FIG. 2 shows a circuit configuration of the central control device 6 shown in FIG. 1, and FIG. 3 is a flow chart showing a control method according to the present invention which employs the central control device 6.

A preferred embodiment of the present invention will be now described with reference to FIGS. 1 to 3, while explaining the structure of the central control device 6 shown in FIG. 2.

Referring to FIG. 3, when a control operation is started in the step 101, one vibration applying device to be controlled is selected in the step 102 among the vibration applying devices 4*a* to 4*f*. Assume now that a first vibration applying device 4*a* is selected while the method how to select the vibration applying device will be explained later. Further, each of the vibration applying devices 4*a* to 4*f* is put in a driven state having an appropriate phase and an appropriate amplitude actuated by a corresponding one of the output signals from the central control device 6, when or before the control operation is started.

Next, an initial input is received in the step 103. That is, it is determined which of the vibration sensors 5*a* to 5*t* is selected as the sensor whose output is first taken in. Further, in the case where the output of the first vibration sensor 5*a* is first taken in, an input switching device 7 and a memory selection switching device 9 are set so that the first vibration sensor 5*a* and an amplitude memory 10*a* are connected to each other. The input switching device 7 includes input terminals, the number of which is equal to the number of the vibration sensors (that is, it is equal to 20 in the present example), one clock input terminal and one output terminal. The input switching device 7 may be a multiplexer in which n input terminals are successively connected to an output terminal in accordance with a clock signal applied to a clock input terminal, and therefore can be formed of, for example, a multiplexer AD7506JD manufactured by ANALOG DEVICES INC., U.S.A. (Note that the AD7506JD has 16 input terminals.) The memory selection switching device 9 may be a multiplexer of the same kind as the input switching device 7, but the input terminals and output terminal of the switching device 7 are used as the output terminals and input terminal of the switching device 9, respectively.

Figure 7:
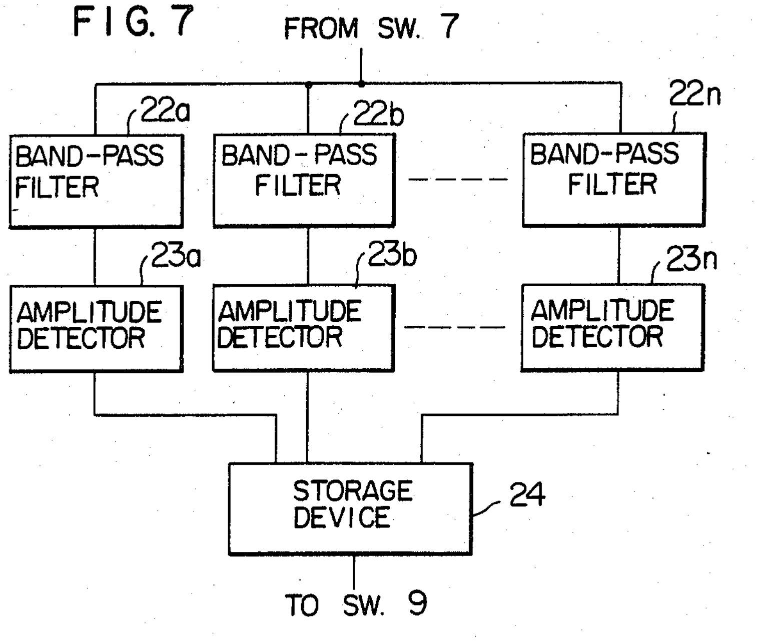
FIG. 7 is a block diagram showing an embodiment of the circuit configuration of the frequency analyzer shown in FIG. 2.

Next, an input is received from the first vibration sensor 5*a* in the step 104, and is then frequency-analyzed by a frequency analyzer 8 in the step 105. For example, the frequency analyzer 8 is, as shown in FIG. 7, made up of a plurality of band-pass filters 22*a* to 22*n* having predetermined center frequencies (for example, 100 Hz, 200 Hz, 300 Hz, 400 Hz, and so on), amplitude detectors 23*a* to 23*n* and a storage device 24. Since the band-pass filters, the amplitude detectors and the storage device are known well, the explanation thereof is omitted. Then, the respective amplitudes of the frequency components of a received signal are detected, and these detected values are temporarily stored in the storage device 24. When the detected amplitude values with respect to all of the frequency components of the input from the first vibration sensor 5*a* have been stored in the storage device 24, the stored amplitude values are transferred to the first amplitude memory 10*a* through the switching device 9.

Next, it is judged in the step 106 whether the outputs of all the vibration sensors 5*a* to 5*t* have been taken in or not. This judgment may be made by detecting the number of clocks which are counted by a counter (not shown) connected to a clock generator 21. At the present time, the result of judgment is "NO", since only the output from the first vibration sensor 5*a* has been taken in. Accordingly, the respective set positions of the input switching device 7 and the memory selection switching device 9 are advanced by one in response to the next clock signal in the step 107, and then the processing in the step 104 is again carried out. That is, an input is received from the second vibration sensor 5*b*. In the above manner, the processing in steps 104 to 107 is repeated. When detected amplitude values with respect to respective frequency components of the input signals from all the vibration sensors 5*a* to 5*t* have been stored in the amplitude memories 10*a* to 10*t*, the result of judgment in the step 106 is "YES", and the processing in the step 108 is performed.

A sampling operation in which input signal is taken out of each of the vibration sensors 5*a* to 5*t*, is performed at a frequency which is, for example, one thirty-second or one sixty-fourth of the frequency of the vibration. When sample values each obtained in one cycle of the vibration have been received from all of the vibration sensors 5*a* to 5*t*, the processing in the step 108 is carried out.

Figure 8:
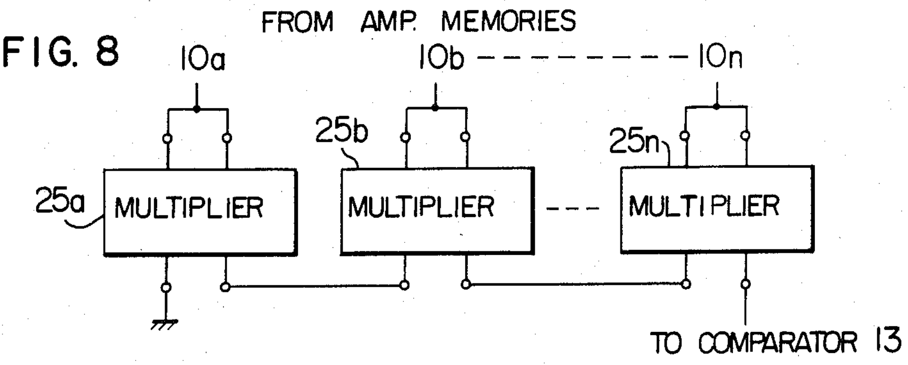
FIG. 8 is a block diagram showing an embodiment of the circuit configuration of the square summing circuit shown in FIG. 2.

In the step 108, the data stored in the amplitude memories 10*a* to 10*t* is read out at each frequency component to calculate the sum of the squares of the read-out amplitude values by a square summing circuit 11 at each frequency component. The square summing circuit 11 is, as shown in FIG. 8, made up of multipliers 25*a* to 25*n*. Each of the multipliers may be a well-known one, and may be, for example, a multiplier AD534JH manufactured by ANALOG DEVICES INC., U.S.A.

Next, the processing in the step 109 is carried out. In this step, the result of the above-mentioned calculation is compared with the preceding sum of squares stored in a memory 12, by means of a comparator 13, at each frequency component, and is stored in the memory 12 in place of the preceding sum of squares. In the first cycle of the sampling operation after the control operation is started, the result of calculation is merely stored in the memory 12, since any data to be compared with the result of calculation is not stored in the memory 12.

The comparator 13 may be a comparator AD351JH manufactured by ANALOG DEVICES INC. Alternatively, the result of calculation may be converted by an A/D converter (for example, a converter AD571 manufactured by ANALOG DEVICES INC.) into a digital signal to be compared with the preceding sum of the squares which has the form of a digital signal, by a digital comparator (for example, a comparator HD7485 manufactured by HITACHI LTD.).

Figure 9:
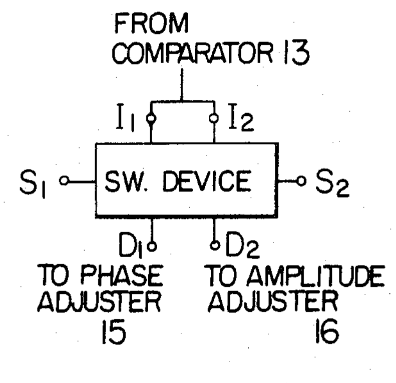
FIG. 9 is a block diagram showing an embodiment of the circuit configuration of the switching device 14 shown in FIG. 2.

Next, the processing in the step 110 is carried out. In this step, either phase adjustment or amplitude adjustment is selected by means of a switching device 14 for changing the method of adjustment. The switching device 14 may be such a device as shown in FIG. 9, for example, a switching device AD7510DI manufactured by ANALOG DEVICES INC. In this case, the ON-OFF action between an input terminal $I_1$ and an output terminal $D_2$ is controlled by a control signal applied to a control terminal $S_1$, and the ON-OFF action between an input terminal $I_2$ and an output terminal $D_2$ is controlled by the control signal applied to a control terminal $S_2$. A method of applying the control signal will be described later.

Figure 10:
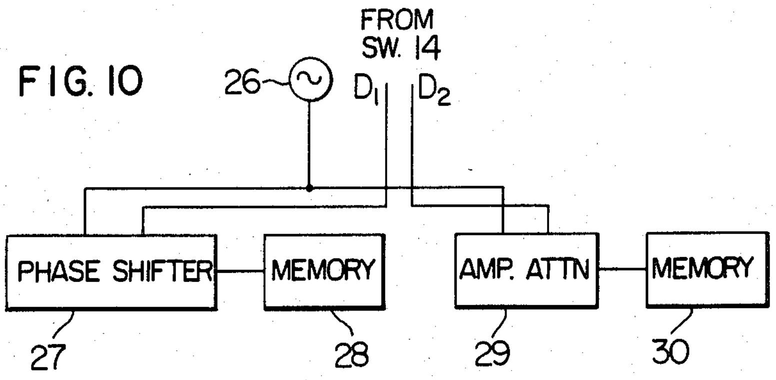
FIG. 10 is a block diagram showing an embodiment of the circuit configuration of the phase adjuster and amplitude adjuster shown in FIG. 2.

Now, let us first consider the case where connection is made between the terminal $I_1$ and terminal $D_1$ so that the phase adjustment is performed. The processing in the step 111 is carried out, that is, the phase of a signal is shifted by a predetermined amount by a phase adjuster 15. The phase adjuster 15 is, as shown in FIG. 10, made up of an oscillator 26, a phase shifter 27 and a memory 28. The oscillator 26 may be a well-known CR oscillator, and the phase shifter 27 may be, for example, a phase shifter UP-752 manufactured by N. F. CIRCUIT DESIGN BLOCK CORP., Japan. The phase of a signal generated by the oscillator 26 is shifted by the phase shifter 27 in accordance with a signal which is supplied from the comparator 13 to the phase shifter 27 through the switching device 14. Thus, a signal having a desired phase is outputted from the phase adjuster 15. The memory 28 stores therein the result of the present phase adjustment, which is used as a basis for judgment in the next phase adjustment. The memory 28 may be a well-known one.

Next, the processing in the step 113 is carried out. In this step, a phase-adjusted output signal is outputted from an output signal generator 17, and is sent to a first output-signal storing memory 19*a* for the first vibration applying device 4*a*, through an output switch 18, to be stored in the memory 19*a*. The position of the switching device 18 has been set to correspond to the first vibration applying device 4*a* when the device 4*a* has been selected to be controlled in the step 102. The output signal generator 17 superposes the adjusted signals at all the frequency components, each of which has a phase and an amplitude determined by the phase adjuster 15 and the amplitude adjuster 16 respectively, to form a signal, and holds the signal thus formed to output it as soon as a request is issued from the output switching device 18. The output signal generator 17 may be formed of a well-known memory device. The output switching device 18 may be, for example, a switching device AD7506JD manufactured by ANALOG DEVICES INC., as the input switching device 7 does. The switching operation of the output switching device 18 is dependent upon a method of selecting the vibration applying device to be controlled, which method will be described later. Further, each of the output signal storing memories 19*a* to 19*f* may be a well-known memory.

The output signal stored in the first output signal storing memory 19*a* is amplified by a power amplifier 20*a*, and thus the first vibration applying device 4*a* vibrates with a phase and an amplitude both corresponding to the output signal. At this time, the remaining vibration applying devices 4*b* to 4*f* are not controlled, and therefore produce unchanged vibration applying forces as before.

Next, it is judged in the step 114 whether a predetermined control (namely, a predetermined phase adjustment or amplitude adjustment) for the first vibration applying device 4*a* has been completed or not. The predetermined control means that a control operation (namely, phase adjustment or amplitude adjustment) is performed for one vibration applying device a predetermined number of times, or the control operation (namely, phase adjustment or amplitude adjustment) is performed for one vibration applying device until a predetermined vibration level is obtained. In order to carry out the former method, that is, in order to perform the control operation the predetermined number of times, the control terminals $S_1$ and $S_2$ of the switching device 14 are connected to the phase adjuster 15 and amplitude adjuster 16 through counters 15' and 16', respectively. In the case where the phase adjuster 15 is first turned on, when the output from the phase adjuster 15 has been applied to the counter 15' the predetermined number of times, the phase adjuster 15 is turned off and the amplitude adjuster 16 is turned on. Further, in order to carry out the latter method, for example, the control terminals $S_1$ and $S_2$ of the switching device 14 are alternately applied with a control signal from the comparator each time the output of the comparator 13 becomes less than a predetermined value, to change one of the phase adjustment and amplitude adjustment over to the other. At the present time, the result of judgment in the step 114 is "NO", since only the first phase control operation has been performed. Thus, the control operation starting from the step 103 is again performed for the first vibration applying device 4*a*.

In the second and subsequent control operations for the first vibration applying device 4*a*, the present data is compared with the preceding data in the step 109, since the preceding data is stored in the memory 12 for storing the sum of the squares, Thus, it is determined whether the present sum of the squares is larger than the preceding sum of squares by the preceding phase adjustment or not. In the second phase adjustment in the step 111, adjustment is made in the direction of decreasing the sum of the squares at each frequency component. The processing in the steps 104 to 114 is repeated several times, that is, phase adjustment is performed in the direction of decreasing the sum of the squares at each frequency component. When the predetermined time of phase adjustment has been completed, the switching device 14 is set to the side of amplitude adjustment in the step 110 of the succeeding control operation, so that the amplitude adjustment is performed in the step 112. Thereafter, the processing in the steps 104 to 114 is repeated several times, so that the amplitude adjustment is performed in the direction of decreasing the sum of the squares, at each frequency component. When the predetermined times of amplitude adjustment has been completed, the result of judgment in the step 114 will be "YES". Thereafter, the first vibration applying device 4*a* is kept in a vibrating state obtained by the above adjustment until the next control is made.

When the result of judgment in the step 114 becomes "YES", the processing in the step 102 is again carried out, that is, a vibration applying device to be subsequently controlled is selected. Now, assume that a second vibration applying device 4*b* is selected. Then, the set position of the output switch 18 is changed so that the second vibration applying device 4*b* is controlled, and the second vibration applying device 4*b* is subjected to the same control as the first vibration applying device 4*a*.

When the phase adjustment and amplitude adjustment for the second vibration applying device 4*b* have been completed, the remaining vibration applying devices are controlled, for example, in the order of a third vibration applying device 4*c*, a fourth vibration applying device 4*d*, and so on. The algorithm of the a method of successively selecting the vibration applying devices will be described later.

The calculation made by the square summing circuit 11 in the step 108 is to obtain an index of performance defined by the following equation:

$$J = \sum_{m=1}^{M} |\epsilon_m|^2 \quad (1)$$

where J indicates an index of performance expressed by the sum of squares, $\epsilon_m$ a measured value of amplitude of the vibration detected by each of the vibration sensors 5*a* to 5*t*, m the number of the vibration sensor ($1 \leqq m \leqq M$), and M the total number of vibration sensors ($M=20$ for the example shown in FIGS. 1 and 2).

The phase adjustment and the amplitude adjustment are performed by the phase adjuster 15 and the amplitude adjuster 16, respectively, so as to decrease the index of performance J.

Now, an adjusting procedure in the amplitude adjuster 16 will be explained with reference to FIG. 4, by way of example. This procedure corresponds to the processing in the step 112 shown in FIG. 3.

The amplitude adjuster 16 is, as shown in FIG. 10, made up of the previously-mentioned oscillator 26 (namely, a well-known CR oscillator), a variable attenuator 29 for reducing an amplitude of signal (for example, a variable resistor) and a memory 30 (namely, a well-known memory device).

The amplitude adjustment is performed at each of the frequency components obtained by the frequency analysis. First, a frequency component at which the amplitude adjustment is to be made, is set in the step 121. In the step 122, it is judged from the contents of the memory 30 whether the preceding amplitude adjustment at the set frequency component has increased or decreased the amplitude of the signal generated by the oscillator 26. On the other hand, it is judged from the output of the comparator 13 whether the present sum of the squares of respective amplitudes of frequency components having the set frequency (namely, the present index of performance J) is larger or smaller than the preceding index of performance. Now, let us consider the case where the preceding amplitude adjustment was made in the direction of increasing the amplitude of the signal generated by the oscillator 26 (hereinafter referred to as "oscillation signal") and thereby the present sum of the squares is larger than the preceding sum of the squares. In this case, the increase in amplitude of the oscillation signal at the preceding adjustment was undesirable, and therefore the present amplitude adjustment is performed in the direction of decreasing the amplitude of the oscillation signal. That is, since the result of judgment in the step 122 is "YES" and the result of judgment in the step 123 is "YES", the amplitude of the oscillation signal is decreased in the step 126. Further, in the case where the preceding amplitude adjustment was performed in the direction of increasing the amplitude of the oscillation signal (that is, the result of judgment in the step 122 is "YES") and thereby the present sum of the squares is smaller than the preceding sum of the squares (that is, the result of judgment in the step 123 is "NO"), the increase in the amplitude of the oscillation signal at the preceding adjustment was desirable, and therefore the present amplitude adjustment is performed in the direction of increasing the amplitude of the oscillation signal (in the step 125). In the case where the preceding amplitude adjustment was performed in the direction of decreasing the amplitude of the oscillation signal, it is judged in the step 124 whether the preceding adjustment was right or not. When the preceding adjustment was right, the present adjustment is performed in the direction of decreasing the amplitude of the oscillation signal. When the preceding adjustment was wrong, the present adjustment is performed in the direction of increasing the amplitude of the oscillation signal. Thus, a new amplitude of the oscillation signal for the set frequency is determined in the step 127. Next, it is judged in the step 128 whether the amplitude adjustment has been performed at all of the frequency components predetermined to control or not. When the result of judgment in the step 128 is "NO", the processing in the step 121 is again performed, that is, another frequency is set, and the above-mentioned amplitude adjustment is again performed. When the amplitude adjustment for all of the frequency components has been completed, the result of judgment in the step 128 becomes "YES", and thus the amplitude adjustment in the step 112 shown in FIG. 3 terminates.

Figure 4:
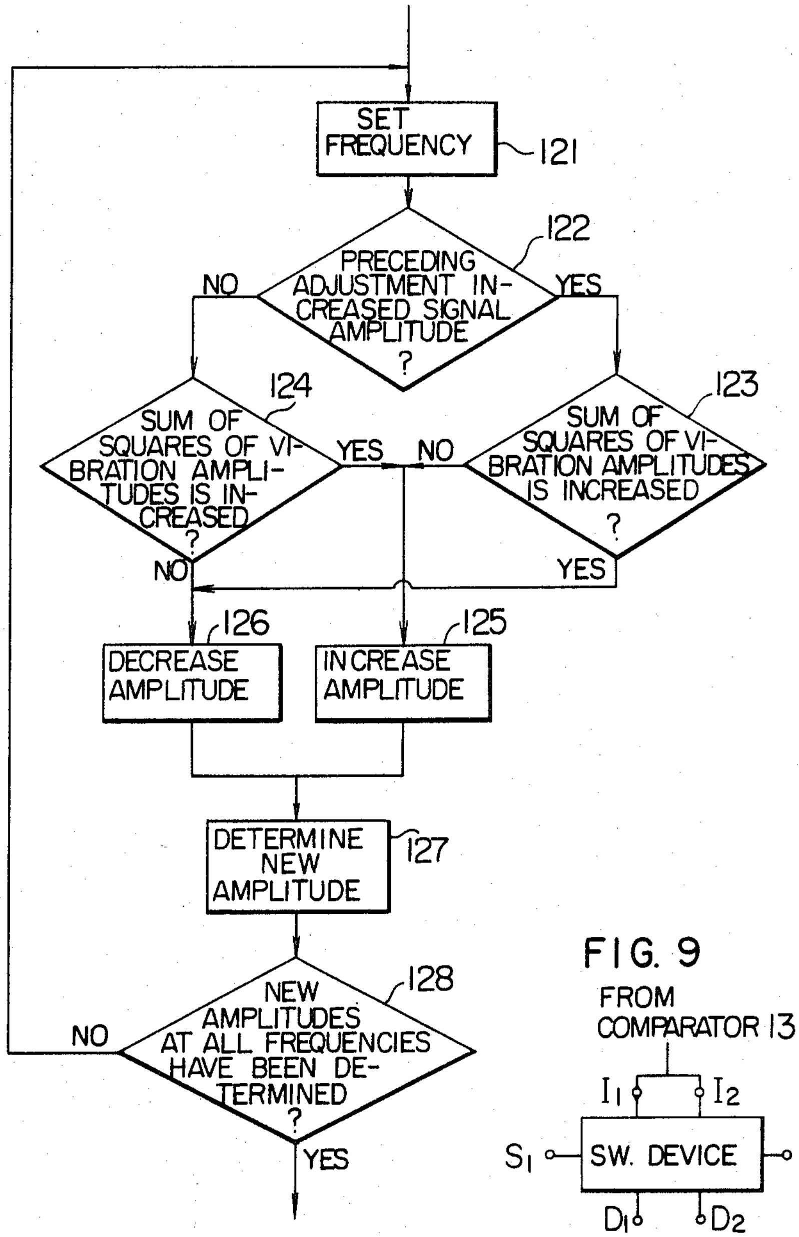
FIG. 4 is a flow chart showing an actual example of the amplitude adjustment shown in FIG. 3.

While FIG. 4 is a flow chart showing an example of the amplitude adjusting procedure, the phase adjustment is performed in a similar manner thereto, and therefore the explanation thereof is omitted.

Next, explanation will be made on the algorithm of a method of selecting a vibration applying device to be controlled. This algorithm corresponds to the processing in the step 102 shown in FIG. 3.

Figure 5:
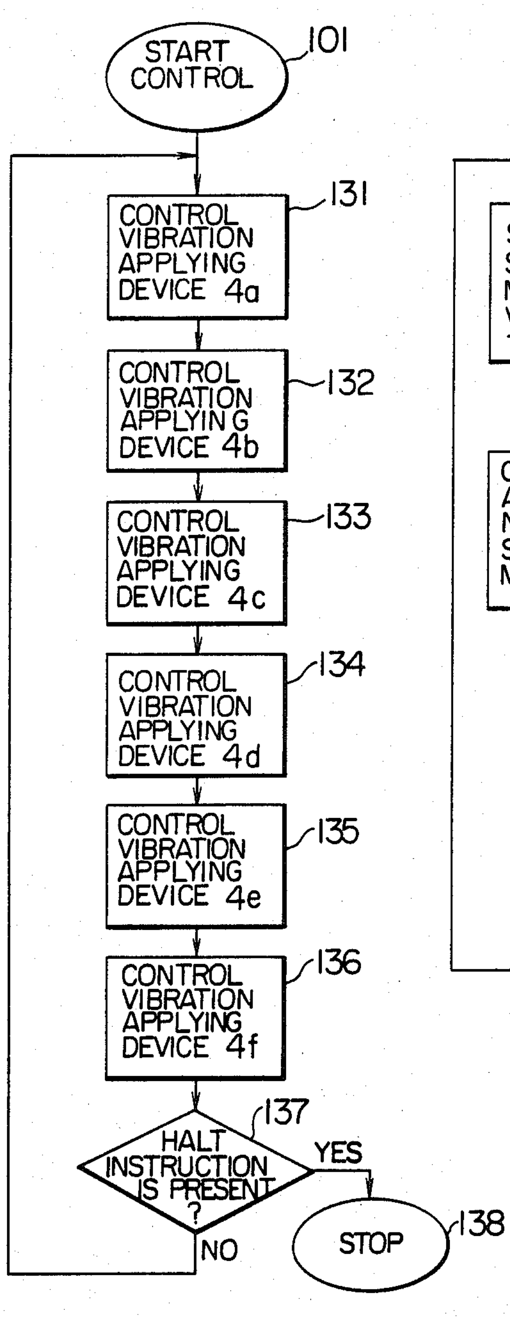
FIG. 5 is a flow chart showing an example of a method of selecting a vibration applying device to be controlled.

FIG. 5 shows a flow chart in the case where the vibration applying devices 4*a* to 4*f* are successively selected in a predetermined order, as an example of the above-mentioned algorithm. When control is started in the step 101, the respective vibration applying devices 4*a* to 4*f* shown in FIGS. 1 and 2 begin to vibrate on the basis of predetermined initial values. When the first vibration applying device 4*a* is first selected on the basis of the predetermined order in the step 131, the phase and amplitude of the output signal supplied to the first vibration applying device 4*a* are determined in accordance with the flow charts shown in FIGS. 3 and 4, so that the index of performance J expressed by Equation (1) has a minimum value or becomes less than a predetermined value. The output signal thus determined is stored in the output signal storing memory 19*a* shown in FIG. 2, and continues to drive the first vibration applying device 4*a*. That is, the device 4*a* continues to produce the thus adjusted vibration applying force.

Next, the adjustment with respect to the second vibration applying device 4*b* is performed in the step 132. The output signal supplied to the second vibration applying device 4*b* is adjusted so that the index of performance J has the minimum value or becomes less than the predetermined value, as in the first vibration applying device 4*a*. The thus adjusted output signal is stored in the output signal storing memory 19*b*. At this time, the first vibration applying device 4*a* continues to produce the adjusted vibration applying force, and the third, the fourth, the fifth and the sixth vibration applying devices 4*c* to 4*f* are kept in the initial states. When the adjustment of the vibration applying force produced by the second vibration applying device 4*b* has been completed, the vibration applying force of the third vibration applying device 4*c* is adjusted in the step 133.

Further, the respective vibration applying force of the fourth, the fifth and the sixth vibration applying devices 4*d*, 4*e* and 4*f* are successively adjusted in the above-mentioned manner. When the vibration applying force of the sixth vibration applying device 4*f* has been adjusted in the step 136, the vibration applying devices 4*a* to 4*f* are driven by the output signals stored in the output signal storing memories 19*a* to 19*f*. Next, the vibration applying force of the first vibration applying device 4*a* is again adjusted while keeping the respective vibration applying forces of the vibration applying devices 4*b* to 4*f* as they are, and the contents of the output signal storing memory 19*a* are updated. Thereafter, the respective vibration applying forces of the vibration applying devices 4*b* to 4*f* are successively adjusted, and the contents of the output signal storing memories 19*b* to 19*f* are updated. The above-mentioned control operation is performed repeatedly so long as a transformer or reactor, whose vibration is to be reduced, is kept in ts running state. This is because the vibrating state of the tank 1 varies with time, and because it is necessary to successively cancel the influence of a newly-adjusted vibration applying device on a previously-adjusted vibration applying device.

The vibration applying devices 4*a* to 4*f* can be selected in the predetermined order by changing the set position of the switching device 18 by a clock signal from the clock generator 21. Alternatively, the set position of the switching device 18 may be changed in response to the outputs of the amplifiers 20*a* to 20*f*.

It is judged in the step 137 whether the halt instruction from the outside is present or not. When the halt instruction has been issued, halt processing is performed in the step 138.

The predetermined order in selecting the vibration applying devices may be the order of numerical numbers which are given to the vibration applying devices at random. Further, the vibration applying devices may be selected in an order mentioned below. That is, the vibrations of the tank are previously measured in the state that the vibration applying devices stand still. A vibration applying device provided at a position where the amplitude of vibration is smallest, is determined as the first vibration applying device, and the second to sixth vibration applying devices are determined in the order of increasing amplitude. In other words, according to this method, the vibration applying devices are adjusted in the order from one device provided at a position where the amplitude of vibration is smaller to another device provided at a position where the amplitude of vibration is greater. A position where the amplitude of vibration is small in the state that the vibration applying devices stand still, is determined by the vibration characteristic of the tank depending on the structure thereof, and is considered to be such a portion of the tank that is hard to vibrate. Accordingly, such a position is little affected by vibration applying devices which are adjusted after the vibration applying device provided at this position has been adjusted. Thus, the adjustment can be efficiently performed, so that an optimum reduced-vibration state can be obtained in a relatively short time.

Further, according to the above-mentioned method, the control is made in such a manner that the sum of the squares of the vibration amplitudes detected at various portions of the tank is decreased, whereby the vibrations of the tank can be appropriately reduced on the whole.

Figure 6:
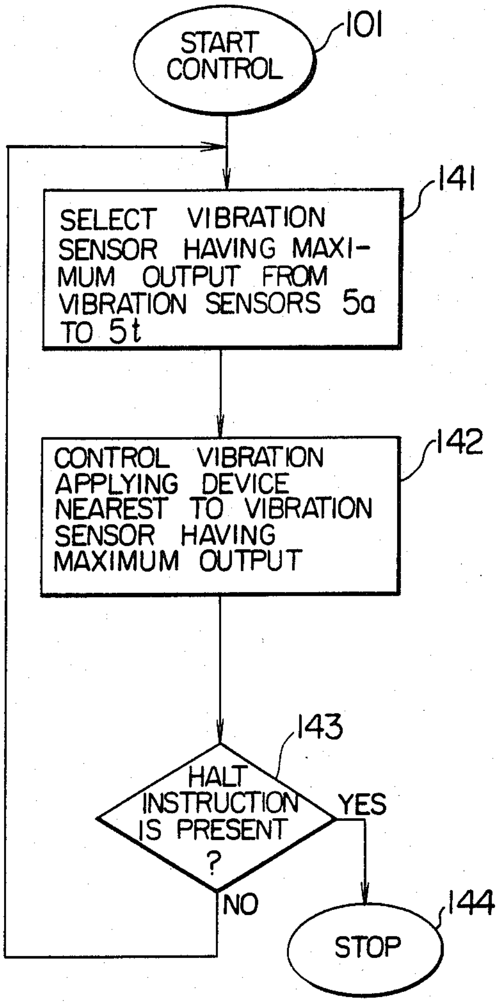
FIG. 6 is a flow chart showing another example of a method of selecting a vibration applying device to be controlled.

FIG. 6 is a flow chart showing another method of selecting a vibration applying device to be controlled. A vibration sensor whose output is the maximum of all is selected from all the vibration sensors 5*a* to 5*t* in the step 141. Next, the output signal supplied to a vibration applying device disposed nearest to the selected vibration sensor is adjusted in the step 142 so that the index of performance J expressed by Equation (1) has a minumum value or becomes less than a predetermined value. The thus adjusted output signal is stored in an output signal storing memory corresponding to the above-mentioned vibration applying device which then continues to produce an adjusted vibration applying force. (The processing in the step 142 is performed in accordance with the procedures shown in FIGS. 3 and 4.) In this state, the processing in the step 141 is again performed, that is, a vibration sensor whose output is the maximum of all is selected. In the step 142, the output signal supplied to a vibration applying device nearest to the above-mentioned secondly selected vibration sensor is adjusted. Such an operation is repeated until an external halt instruction is received. When the halt instruction has been received, the presence thereof is judged in the step 143, and the halt processing is performed in the step 144.

Figure 11:
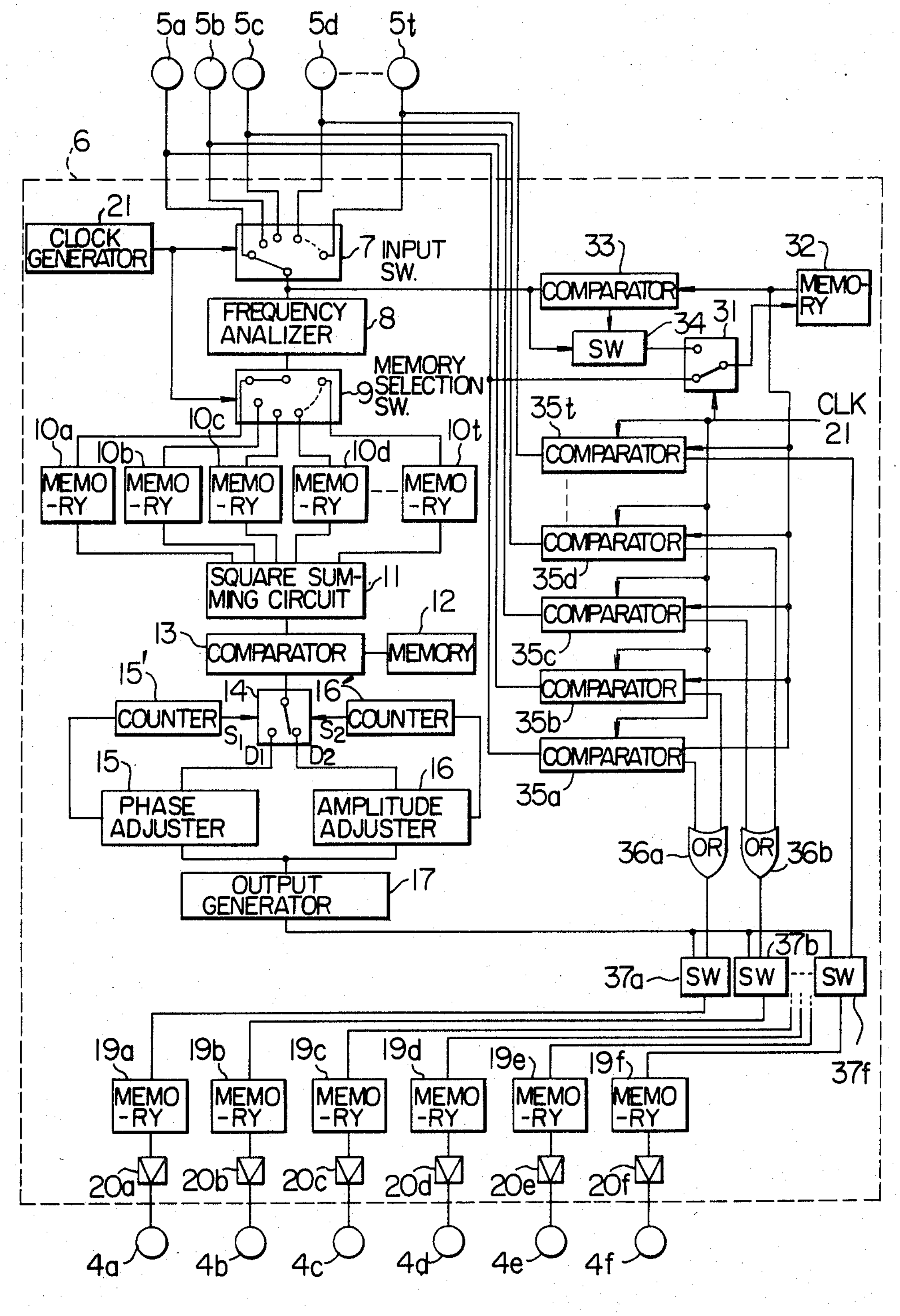
FIG. 11 is a block diagram showing another embodiment of the central control device shown in FIG. 1, which is employed to carry out an embodiment of the present invention based upon the flow chart shown in FIG. 6.

FIG. 11 is a block diagram showing another example of the central control device 6 for carrying out the flow chart shown in FIG. 6. The central control device shown in FIG. 11 is a modified version of that shown in FIG. 2. In FIGS. 2 and 11, like reference numerals designate like elements and parts.

In the method shown in FIG. 6, the processing including the steps of receiving the detected values from the vibration sensors 5*a* to 5*t*, calculating the sum of the squares of the detected amplitude values at each frequency component, and outputting an electric signal having a desired phase and a desired amplitude from the output signal generator 17, is the same processing as explained with respect to FIG. 2. In the present method, however, the following steps are carried out in parallel to the above-mentioned steps. That is, when the input switching device 7 is first set to the vibration sensor 5*a*, a switching device 31 (for example, a switching device AD7510DI manufactured by ANALOG DEVICES INC.) is set to the lower side as shown in FIG. 11, and the detected amplitude values from the vibration sensor 5*a* is stored, as the initial value for detecting a maximum amplitude value, in a memory 32. The movable contact of the switching device 31 is set to the upper side immediately after the output signal of the vibration sensor 5*a* has passed through the switching device 31, and is kept in this state until the next output signal of the sensor 5*a* is made to pass through the switching device 31. The above-mentioned movable contact is set in synchronism with the operation of the input switching device 7, and is operated by the clock signal from the clock generator 21. When the output signal of the vibration sensor 5*a* passes through the switching device 31, it is also applied to a comparator 33 through the input switching device 7 to be compared with the contents of the memory 32. Since the memory 32 has been cleared, the input from the memory 32 to the comparator 33 is zero, and therefore the output of the comparator 33 is zero. When the output of the vibration sensor 5*b* is subsequently supplied to the comparator 33 through the input switching device 7, the comparator 33 compares the output of the sensor 5*b* with the contents of the memory 32. In the case where the former is smaller than the latter, the contents of the memory 32 are left unchanged. On the other hand, in the case where the former is larger than the latter, the comparator 33 delivers an output signal to close a switch 34 (for example, a switching device HD 74LS367 manufactured by HITACHI LTD.), and thus the signal from the input switching device 7, that is the output of the sensor 5*b*, is applied through the switching device 31 to the memory 32 to be stored therein as a maximum value. The above-mentioned operation is performed for each of the outputs of the vibration sensors 5*c* to 5*t*. Immediately after the comparison of the output of the sensor 5*t* with the contents of the memory 32 has been completed, comparators 35*a* to 35*t* are operated. The comparators 35*a* to 35*t* are provided so as to correspond to the vibration sensors 5*a* to 5*t*, respectively, that is, one to one correspondence is formed between the comparators 35*a* to 35*t* and vibration sensors 5*a* to 5*t*. A time when the comparators 35*a* to 35*t* are operated, is determined by the clock signal from the clock generator 21. In the comparators 35*a* to 35*t*, the respective outputs of the associated sensors 5*a* to 5*t* are compared with the contents of the memory 32, namely, a maximum amplitude value stored therein. Thus, it is seen which of the sensors 5*a* to 5*t* detected the maximum amplitude value. The output terminals of the comparators 35*a* and 35*b* are connected to an OR circuit 36*a*, and the output terminals of the comparators 35*c* and 35*d* are connected to an OR circuit 36*b*. Further, the OR circuits 36*a* and 36*b* are connected to switching devices 37*a* and 37*b*, respectively. The output terminal of the comparator 35*t* is directly connected to a switching device 35*f*. The switching devices 37*a* to 37*f* are provided so as to respectively correspond to the vibration applying devices 4*a* to 4*f*. Accordingly, the fact that, in the circuit configuration, the OR circuit 36*a* is connected to the comparators 35*a* and 35*b* and the OR circuit 36*b* is connected to the comparators 35*c* and 35*d*, means that the vibration sensors 5*a* and 5*b* are associated with the vibration applying device 4*a* and the sensors 5*c* and 5*d* are associated with the vibration applying device 4*b*. Further, the fact that the comparator 35*t* is directly connected to the switching device 37*f* through no OR circuit, means that only the vibration sensor 5*t* is associated with the vibration applying device 4*f*. (The above-mentioned relation is shown only for the convenience of explanation, and therefore disagrees with the state shown in FIG. 1). If the vibration sensors 5*e*, 5*f*, 5*g* and 5*h* are associated with the vibration applying device 4*c*, the outputs of the comparators 35*e*, 35*f*, 35*g* and 35*h* are supplied to a 4-input OR circuit 36*c* (not shown), which is connected to the switching device 37*c* (not shown). The switching devices 37*a* to 37*f* (each of which may be, for example, a switching device HD74LS367 manufactured by HITACHI LTD.) are connected through the memories 19*a* to 19*f* and the amplifiers 20*a* to 20*f* to the vibration applying devices 4*a* to 4*f*, respectively. From the above-mentioned explanation, it will be readily understood that the phase and amplitude of the signal supplied to a vibration applying device which is associated with a vibration sensor detecting the maximum amplitude value, are updated.

According to this method, a vibration applying device provided at a position where the amplitude of vibration is the largest among all is successively selected to adjust the vibration applying force thereof. Therefore, the number of repetitions in control operation is small, and a time required to obtain an optimum reduced vibration state can be shortened.

Now, as an example of the application of this method, let us consider a control method in the case where the vibration sensors are spaced apart from the vibration applying devices. In this case, a vibration applying device is previously determined which has the greatest influence upon a position where a vibration sensor is provided, and each of the vibration sensors is made to correspond to one vibration applying device in this manner. Thus, a vibration applying device corresponding to a vibration sensor detecting a maximum amplitude value can be immediately selected.

Now, explanation will be made of another embodiment of a vibration reducing method according to the present invention. In general, a structure has a vibration characteristic which is peculiar to that structure. For example, in the tank 1 shown in FIG. 1, the tank reinforcing member 3 is small in amplitude of vibration and contributes a little to noise. On the other hand, the side plate 2 of the tank 1 is large in amplitude of vibration and therefore contributes greatly to noise. Therefore, a weight coefficient $\lambda_m$ is determined for each of the vibration sensors in accordance with the position where the vibration sensor is disposed, and a value detected by each vibration sensor is multiplied by a corresponding weight coefficient $\lambda_m$ so that the product is squared to obtain the sum of the squares. In this case, an index of performance $J_1$ representing the sum of the squares is given by the following equation:

$$J_1 = \sum_{m=1}^{M} |\epsilon_m \cdot \lambda_m|^2 \qquad (2)$$

Alternatively, the value detected by each vibration sensor is first squared and then the square is multiplied by a corresponding weight coefficient $\lambda'_m$ which is different from the value $\lambda_m$ but similarly obtained. In this case an index of performance $J_2$ is given by the following equation:

$$J_2 = \sum_{m=1}^{M} |\epsilon_m|^2 \cdot \lambda'_m \qquad (3)$$

By using the index of performance $J_1$ or $J_2$ defined by Equation (2) or (3), the vibrations of the tank can be reduced more effectively. For example, when the weight coefficient $\lambda_m$ or $\lambda'_m$ of the vibration sensors mounted on the side plate 2, such as the sensors 5*b* and 5*d*, are made larger than those of the sensors mounted on the tank reinforcing member 3, such as the sensors 5*a* and 5*c*, the vibration of the tank is reduced in such a manner that weight is given to the amplitude of the side plate 2. Further, in the case where it is required to reduce vibrations of a structure having a wide face which vibrates uniformly, a small number of vibration sensors are mounted on the wide face, and large weight coefficients are given to these vibration sensors. Then, the number of vibration sensors can be made small, while the vibration reducing effect and vibration reducing efficiency are not lowered.

Further, in the above-mentioned embodiments, it has been described that the vibration applying devices are controlled individually and separately. However, it should be appreciated that two or more vibration applying devices forming one unit may be controlled together.

While methods for reducing vibrations per se have been described in the above-mentioned embodiments, noises caused by vibrations may be directly reduced. In this case, a noise sensor and a loud-speaker are substituted for the vibration sensor and the vibration applying device so that a noise reducing sound wave generated by the loud-speaker interfers with the noise to reduce it.

We claim:

1. A method for reducing vibrations generated in a stationary induction apparatus comprising the steps of detecting the vibrations by vibration sensing means, and applying a vibration applying force capable of suppressing the detected vibrations to said stationary induction apparatus by vibration applying means; wherein said method comprises the further steps of:

energizing said vibration applying means;

receiving detected amplitude values of the vibrations from a plurality of vibration sensors constituting said vibration sensing means;

calculating the sum of the squares of said amplitude values of vibration; and varying the phase and amplitude of the vibration applying force outputted from said vibration applying means in the direction of decreasing the calculated sum of the squares of amplitude values of vibration.

2. A method according to claim 1, in which a plurality of vibration applying devices are provided as said vibration applying means, wherein said steps of receiving detected amplitude values of vibration, calculating the sum of the squares, and varying the phase and amplitude of the vibration applying force are carried out with one of said vibration applying devices selected from among said plurality of vibration applying devices, while all of said vibration applying devices are being energized, and wherein when one cycle of said steps is completed, other cycles of said steps are successively repeated with other selected vibration applying devices.

3. A method according to claim 2, wherein said plurality of vibration applying devices are successively selected one by one in a predetermined order to adjust the vibration applying force thereof.

4. A method according to claim 3, wherein amplitudes of vibration at positions where said vibration applying devices are respectively provided, are measured in a state that none of said vibration applying devices are energized, and said predetermined order is determined to be the order from one disposed at a position where the detected amplitude of vibration is smaller to another disposed at another position where the detected amplitude of vibration is larger.

5. A method according to claim 2, wherein one of said plurality of vibration applying devices associated with one of said vibration sensors which detects the largest amplitude of vibration among said vibration sensors, is selected so that the vibration applying force thereof is adjusted, and wherein when the adjustment of said vibration applying force has been completed, another vibration applying device is selected in the same manner.

6. A method according to claim 1, wherein a weight coefficient is set for each of said vibration sensors so that in said step of calculating the sum of the squares of detected amplitude values of vibration, each of said detected amplitude values is multiplied by said weight coefficient and then the product is squared or each of said detected amplitude values is squared and then the squared value is multiplied by said weight coefficient.

7. A method for reducing vibrations generated in a stationary induction apparatus comprising the steps of detecting the vibrations by a plurality of vibration sensors disposed at a plurality of positions of said apparatus, and applying vibration applying forces capable of suppressing the detected vibrations to said stationary induction apparatus by a plurality of vibration applying devices, wherein said method further comprises the steps of:

energizing all of said vibration applying devices;

frequency-analyzing amplitude values of vibration respectively detected by said plurality of vibration sensors, in succession and in a predetermined order, to successively store said amplitude values in a state that each of said amplitude values is separated into a plurality of frequency components;

calculating, for each of said frequency components, the sum of the squares of all the stored amplitude value frequency components when all of said amplitude values detected by said vibration sensors have been stored in said state, and comparing the results of calculation with the previously stored preceding results of calculation of the sum of the squares;

updating the contents of storage by substituting said previously stored preceding results of calculation by the present results of calculation;

determining present instruction values with respect to the phase and amplitude of a vibration applying source of a vibration applying device selected in a predetermined order from said plurality of vibration applying devices, on the basis of the previously stored preceding instruction values with respect to the phase and amplitude of the vibration applying force of said selected vibration applying device and said present results of calculation of the sum of the squares;

updating the contents of storage by substituting said previously stored preceding instruction values by the present instruction values;

adjusting the phase and amplitude of the vibration applying force of said selected vibration applying device on the basis of said present instruction values; and selecting said vibration applying devices in succession in said predetermined order to repeat said steps mentioned above.

8. An apparatus for reducing vibrations generated in a stationary induction apparatus, including a plurality of vibration sensors for detecting the vibrations, at least one vibration applying device for applying counter-vibrations to said stationary induction apparatus to cancel said vibrations of said stationary induction apparatus, and control means for controlling the force of said counter-vibrations on the basis of outputs of said vibration sensors, wherein said control means includes means for obtaining the sum of the squares of the amplitudes of vibrations detected by said vibration sensors, and force adjusting means responsive to the obtained sum of the squares for adjusting the phase and amplitude of the counter-vibrations of said vibration applying device in the direction of decreasing said sum of the squares.

9. An apparatus according to claim 8, wherein said apparatus comprises a plurality of vibrations applying devices, and waherein said control means includes means for selecting said vibration applying devices one by one in succession in a predetermined order from among the plurality of vibration applying devices and means for operatively associating said force adjusting means with the selected one of said vibration applying devices.

10. An apparatus according to claim 8, wherein said apparatus comprises a plurality of vibration applying devices, and wherein said control means includes means for selecting the largest amplitude of vibration from said amplitudes of vibration respectively detected by said vibration sensors, and means for operatively associating said force adjusting means with one of said vibration sensors which detects said largest amplitude of vibration.

11. An apparatus for reducing vibrations generated in a stationary induction apparatus, comprising a plurality of vibration sensors for detecting the vibrations, at least one vibration applying device for applying a vibration applying force capable of suppressing said vibrations to said stationary induction apparatus, and control means for controlling said vibration applying force on the basis of the respective outputs of said vibration sensors, wherein said control means includes a microcomputer having a predetermined program for sequentially and cyclically performing an operation for obtaining the sum of the squares of the respective amplitudes of vibration detected by said vibration sensors and another operation for adjusting the phase and amplitude of said vibration applying force of said vibration applying device in accordance with said sum of the squares.

* * * * *